United States Patent [19]

Takashi

[11] Patent Number: 5,497,870
[45] Date of Patent: Mar. 12, 1996

[54] ELECTROMAGNETIC CLUTCH SLIP PROTECTION SYSTEM

[75] Inventor: Ishimaru Takashi, Kiryu, Japan

[73] Assignee: Ogura Clutch Co., Ltd., Japan

[21] Appl. No.: 258,077

[22] Filed: Jun. 10, 1994

[51] Int. Cl.$^6$ .............................. F16D 48/00; H01F 7/18
[52] U.S. Cl. .................. 192/84 C; 192/84 R; 192/82 T; 361/93; 361/103; 361/152
[58] Field of Search .................. 192/84 R, 84 A, 192/84 B, 84 C, 40, 52, 82 T, 103 R; 361/93, 103, 139, 152, 154, 160

[56] References Cited

U.S. PATENT DOCUMENTS

| | | | |
|---|---|---|---|
| 3,917,041 | 11/1975 | Walberg | 192/82 T X |
| 4,509,091 | 4/1985 | Booth | 361/154 |
| 4,567,975 | 2/1986 | Roll | 192/84 C |
| 4,620,261 | 10/1986 | Thornton | 361/154 |
| 4,949,828 | 8/1990 | Olsen | 192/84 R |
| 5,179,496 | 1/1993 | Mimura | 361/154 |
| 5,295,038 | 3/1994 | Matsushita et al. | 361/152 |
| 5,375,031 | 12/1994 | Mimura | 361/152 |

FOREIGN PATENT DOCUMENTS 59-205030  11/1984  Japan .

*Primary Examiner*—Richard M. Lorence
*Attorney, Agent, or Firm*—Reising, Ethington, Barnard & Perry

[57] ABSTRACT

Rotation slip between the rotor and the armature of an electromagnetic clutch results in the exciting current I in the electromagnetic coil decreasing locally abruptly to form a unique waveform. The locally abruptly rising variations in the current is taken out as a locally abruptly variation (an alternating current component) in an inverted and amplified voltage, and the alternating current component is applied to a comparing circuit (400). The instantaneous value of the alternating current component is compared with a threshold which rises as the rotational speed of the rotor becomes higher, and while the instantaneous value exceeds the threshold, a comparison output is outputted. The comparison output is applied to a continuous waveform confirming circuit (500), and if the predetermined number of comparison outputs are detected with a predetermined time after a first comparison output has been generated, it is determined that a rotation slip has occurred. If the predetermined number of comparison outputs are not detected within the predetermined time a comparison output which is next generated is set as a first comparison output and the rotation slip decision operation is repeated.

14 Claims, 6 Drawing Sheets

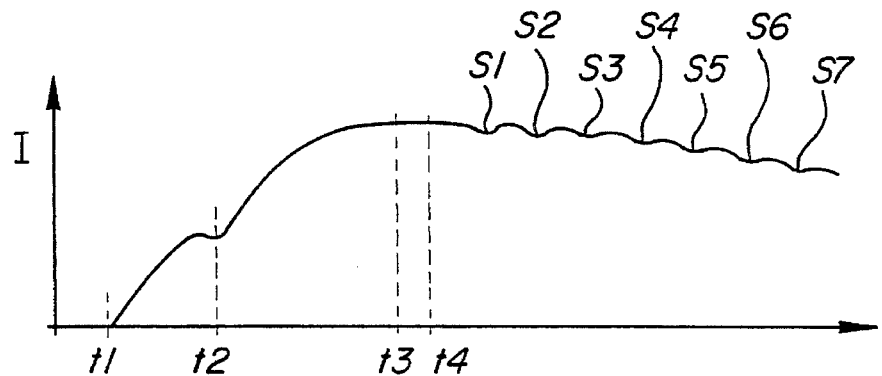
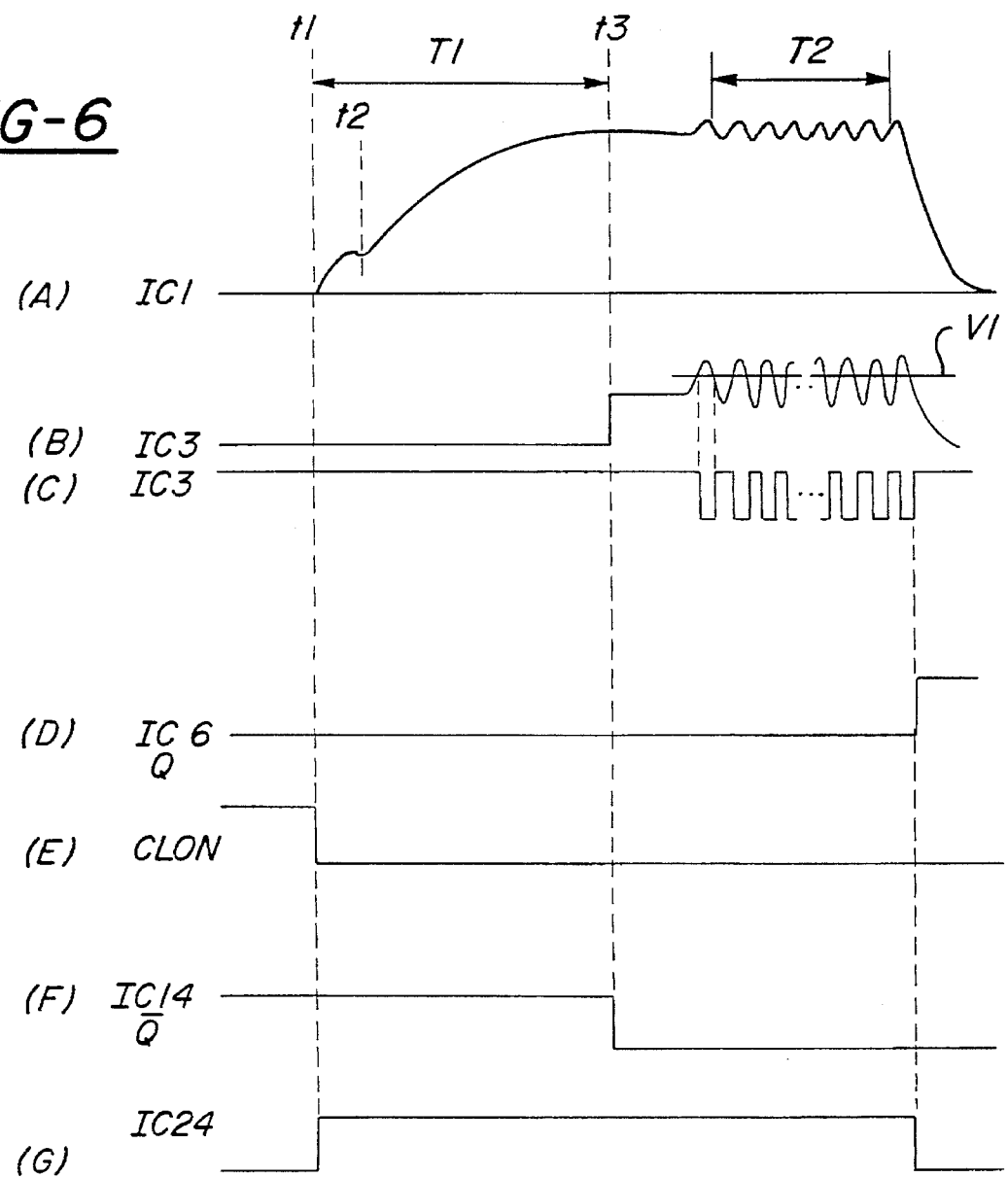

ELECTROMAGNETIC CLUTCH SLIP PROTECTION SYSTEM

TECHNICAL FIELD

The invention relates to an electromagnetic clutch with a control system that senses slippage between a rotor and an armature and deactivates the clutch if the slippage is excessive.

BACKGROUND OF THE INVENTION

Electromagnetic clutches are commonly used on automotive vehicles to drive auxiliary equipment such as air conditioning compressors, air compressors and superchargers. These electromagnetic clutches have a rotor and an armature each of which includes a plurality of arc-shaped slots. The arc-shaped slots are radially spaced from the axis of rotation of the armature and the rotor and extend generally in arcuate paths about the axis of rotation. The arc-shaped slots on the rotor cooperate with the arc-shaped slots on the armature to form magnetic path discontinuities. An electromagnetic coil is mounted adjacent to the rotor. When the electromagnetic coil is energized, the armature and the rotor are attracted to each other, moved into contact and engage the clutch. The rotor is usually driven by a belt that is trained around a belt engaging surface on the rotor and a drive pulley driven by an engine or a motor. The armature is rotationally coupled to an auxiliary device and transmits torque to the auxiliary device from the belt when the electromagnetic clutch is engaged. An abnormally high torque load on the auxiliary device will cause slippage between the rotor and the armature. Slippage between the rotor and the armature generates heat. The heat will damage the belt, a bearing or other parts if slip between the rotor and the armature continues for more than a short period of tine.

Automotive vehicles in use today are frequently equipped with a single belt that transmits power to the rotor of an electromagnetic clutch to drive auxiliary equipment, and to critical components such as water pumps, air compressors, alternators and power steering pumps. With these vehicles a damaged belt or bearing due to a slipping electromagnetic clutch will result in the loss of power to a critical component and the vehicle may become disabled.

Systems to detect slippage between the rotor and the armature of an electromagnetic clutch have been proposed. Upon detecting slippage, the electromagnetic clutch can be disengaged to eliminate clutch damage and to prevent a vehicle from becoming disabled. Systems for detecting slip between the armature and a rotor have sensed the flow of current in an electromagnetic coil in the clutch. The "Electromagnetic Frictional Clutch Device" disclosed in Laid-Open Japanese Patent No. 205030/1984, for example, senses a current induced in the clutch electromagnetic coil by a variation in inductance or magnetic flux in a magnetic circuit to detect slip. The electromagnetic clutch has a yoke in which an electromagnetic coil is accommodated, a rotor with an annular groove that receives the yoke, a frictional surface on the rotor with a plurality of notches or grooves that extend radially at circumferentially spaced intervals, and an armature that can be magnetically attracted to the rotor friction surface which has the same number of slits or grooves as the number of notches or grooves in the armature friction surface. The current flowing in the electromagnetic coil varies when the clutch is engaged depending on the state of overlap of the notches and the rotor and the slits in the armature. Slip between the rotor and the armature is detected by detecting changes in the current flowing through the electromagnetic coil. When slip between the armature and the rotor is detected, the clutch is disengaged.

U.S. Pat. No. 4,949,828 to Olsen discloses another electromagnetic clutch with a rotor and an armature with slots that create magnetic discontinuities so that the rotor and armature cooperate to form a magnetic circuit when the coil is energized and pulls the armature and the rotor into engagement. The slots in the rotor and the armature have a special shape so that slippage between the armature and the rotor produces an alternating current in the direct current flowing in the electromagnetic coil. The presence of the alternating current component can be sensed through a rectifier or frequency filter. The alternating current component is compared with a predetermined threshold in the supply of current and the electromagnetic coil is disconnected from a current supply if the threshold is exceeded.

Detecting slip based on peak magnetic noise is difficult in any system powered by an internal combustion engine. Slip or electrical noise occurring in the low speed rotation range of an engine and rotation noise occurring in the high speed rotation range of an engine are difficult to discriminate between. The operation of other electrical parts can be amplified and their electrical disturbances erroneously recognized as slip. Failure to discriminate between electrical disturbances from the clutch armature and rotor and sources other than the armature and rotor can impair slip detection and render a slip detector unreliable.

SUMMARY OF THE INVENTION

The present invention has been made to solve the problems described above.

An object of the invention is to provide a slip detector for an electromagnetic clutch that has high reliability.

Another object of the invention is to provide a slip detector for an electromagnetic clutch that discriminates between noise in an electromagnetic coil that is induced by slippage between a rotor and an armature and noise that is induced by other sources.

To achieve the above objects, the present invention provides an electromagnetic clutch comprising a rotor and an armature each having magnetic discontinuities and wherein the rotor and the armature are attracted to each other to form a magnetic circuit when a coil is energized. The electromagnetic clutch control circuit includes a current detecting circuit for detecting current flow in the electromagnetic coil and producing an output voltage corresponding to the current, an amplifier for amplifying the voltage output from the current detecting circuit, a bandpass filter for taking out an alternating-current component of lower than a predetermined frequency contained in a voltage amplified by the amplifier, a comparator for comparing a threshold with an instantaneous value of the alternating-current component taken out by the bandpass filter and sending out a comparison output when the instantaneous value of the alternating-current component exceeds the threshold, a threshold adjuster for raising the threshold as the rotational speed of the rotor becomes higher, and a slip decision circuit arranged to determine, if a predetermined number of comparison outputs are detecting within a predetermined time after a first comparison output has been generated, that a rotational slip has occurred in the state of the rotor and the armature being attracted to each other. The slip decision circuit is also arranged to set, if the predetermined number of comparison outputs are not detected within the predetermined time, a comparison output to be next generated as the first comparison output and repeat the aforesaid rotation slip decision operation.

As the annular position of the rotor and the armature vary, inductance rapidly varies and the supply of current to the electromagnetic coil varies. The variation in the supply of current appears as a variation in amplified voltage and this variation is taken out as an alternating-current component. Then the instantaneous value of the alternating-current component thus taken out is compared with the threshold which rises as the rotational speed of the rotor becomes higher. When the instantaneous value of the alternating-current component exceeds the threshold, the comparison output is sent out. Then, if the predetermined number of comparison outputs are detected by the time the predetermined time elapses after the first comparison output has been generated, it is determined that a slip has occurred between the rotor and the armature being attracted to each other. If the predetermined number of comparison outputs are not detected by the time the predetermined time elapses, a comparison output to be next generated is set as the first comparison output and the afore-said rotation slip decision operation is repeated.

The foregoing and other objects, features and advantages of the present invention will become apparent in light of the following detailed description of exemplary embodiments thereof, as illustrated in the accompanying drawings.

BRIEF DESCRIPTION OF THE DRAWINGS

FIG. 5 is a graph showing a variation in a current I supplied to the electromagnetic coil over a time period in which a slip condition begins; and FIG. 6 is a graph showing waveforms appearing in various parts of the control circuit during the time period in which a slip condition begins.

DESCRIPTION OF THE PREFERRED EMBODIMENT

Figure 2:
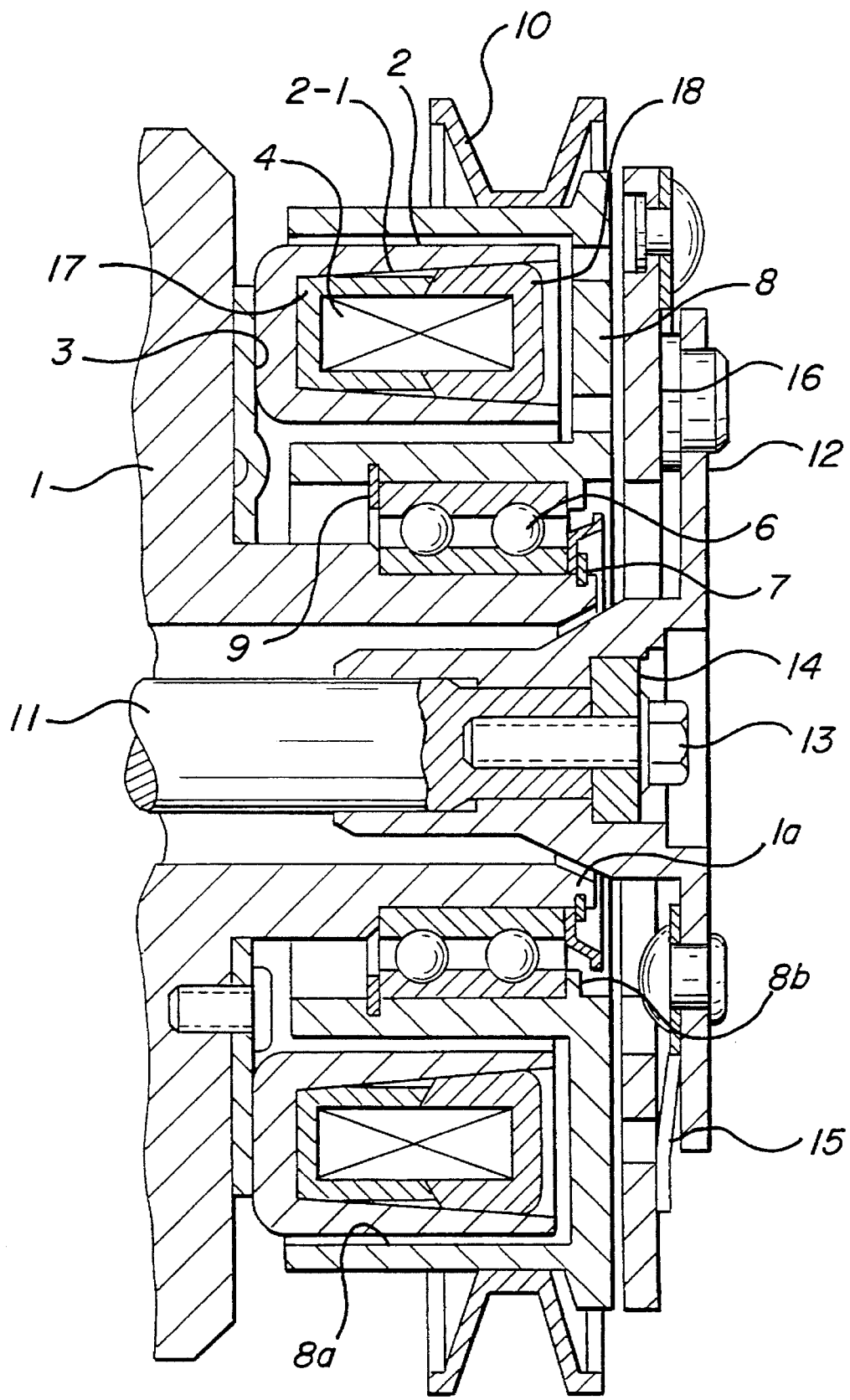
FIG. 2 is a sectional view of an electromagnetic clutch.

FIG. 2 is a cross-sectional view of an electromagnetic clutch controlled by the control circuit of the present invention. In FIG. 2 the housing 1 is a portion of a compressor for an air conditioner for an automotive vehicle. An annular yoke 2 is fixedly supported on the housing 1 by a support plate 3. An electromagnetic coil 4 is accommodated in an annular groove 2-1 formed in the yoke 2.

A nose portion 1a of the housing 1 is fitted with a bearing 6 and axially fixed by a snap ring 7. A rotor 8 provided with an annular groove 8a, into which the yoke 2 is inserted, is fixedly fitted on the outer race of the bearing 6 in such a manner that the axial movement of the rotor 8 is restricted by the projection 8b and the snap ring 9. A V pulley 10 is integrally fixed to the outer periphery of the rotor 8. A V-belt is tensely passed between the V pulley 10 and a driving source (in this embodiment, an engine) in such a manner that the rotor 8 is rotationally driven by the V-belt.

A rotating shaft 11 extends through the central hole of the housing 1 and is rotatably supported by a bearing (not shown) which is positioned in the housing 1. An armature hub 12 is formed into an embossed disk-shape and is fixed to the leading end of the rotating shaft 11 by a bolt 13 and a washer 14. The washer 14 is secured to the hub 12 by staking or by another suitable procedure. A plate spring 15 is riveted at a plurality of locations spaced apart circumferentially equally around the outer circumference of the armature hub 12. An armature 16, which is formed into an annular shape, is fixedly supported on the free end portion of the plate spring 15 at a location between the rotor 8 and the armature hub 12. The armature 16 is urged by the plate spring 15 in a direction away from the rotor 8.

The electromagnetic coil 4 which has an annular shape, is inserted into a coil bobbin 17 in a previously solidified state. The coil bobbin 17 is formed into an annular shape having a U-shaped cross-section, and one-half of the electromagnetic coil 4 is exposed from the coil bobbin. The exposed portion of the electromagnetic coil 4 is covered by a cover 18 which is formed into an annular shape having a U-shaped cross-section.

Figure 3:
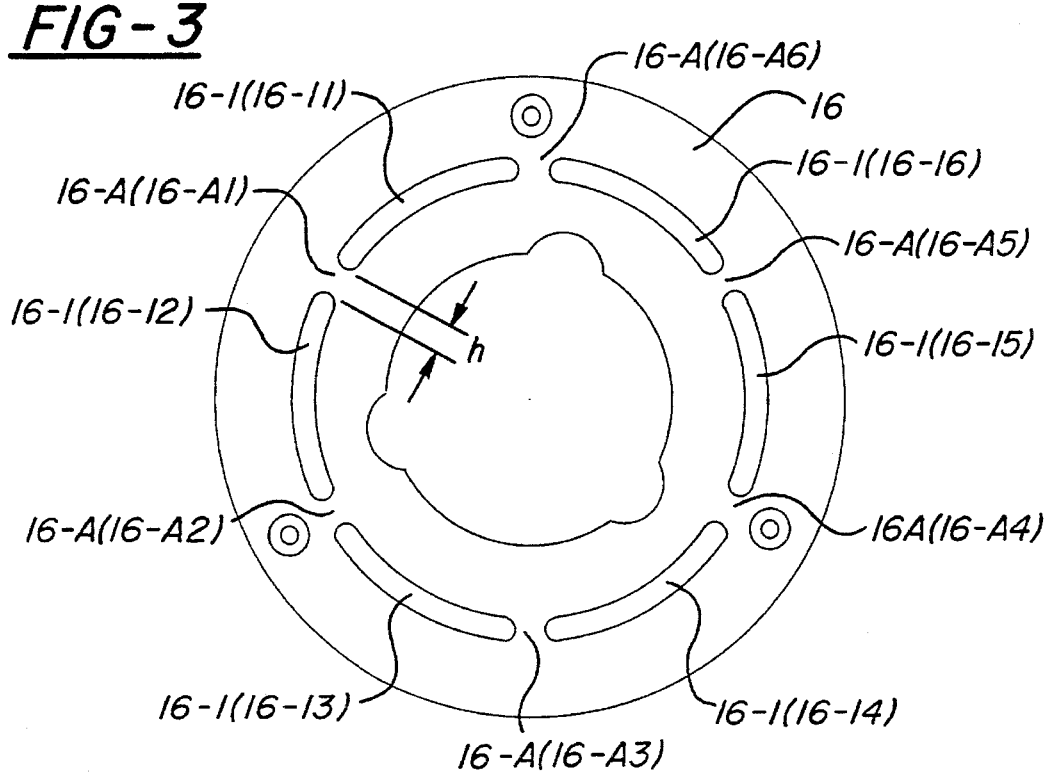
FIG. 3 is an elevational view of the armature used in the electromagnetic clutch taken in an axial direction.

The armature 16, as shown in FIG. 3, includes a plurality of arc-shaped slots 16-1 (16-11 to 16-16), which constitute magnetic discontinuities, that are formed in the armature 16 around the circumference thereof. Each of the slots 16-1 has circumferentially opposed ends whose end faces have a semi-circular shape. Small joint portions 16-A (16-A1 to 16-A6) between the ends of adjacent slots 16-1 are hereinafter referred to as bridges.

Figure 4:
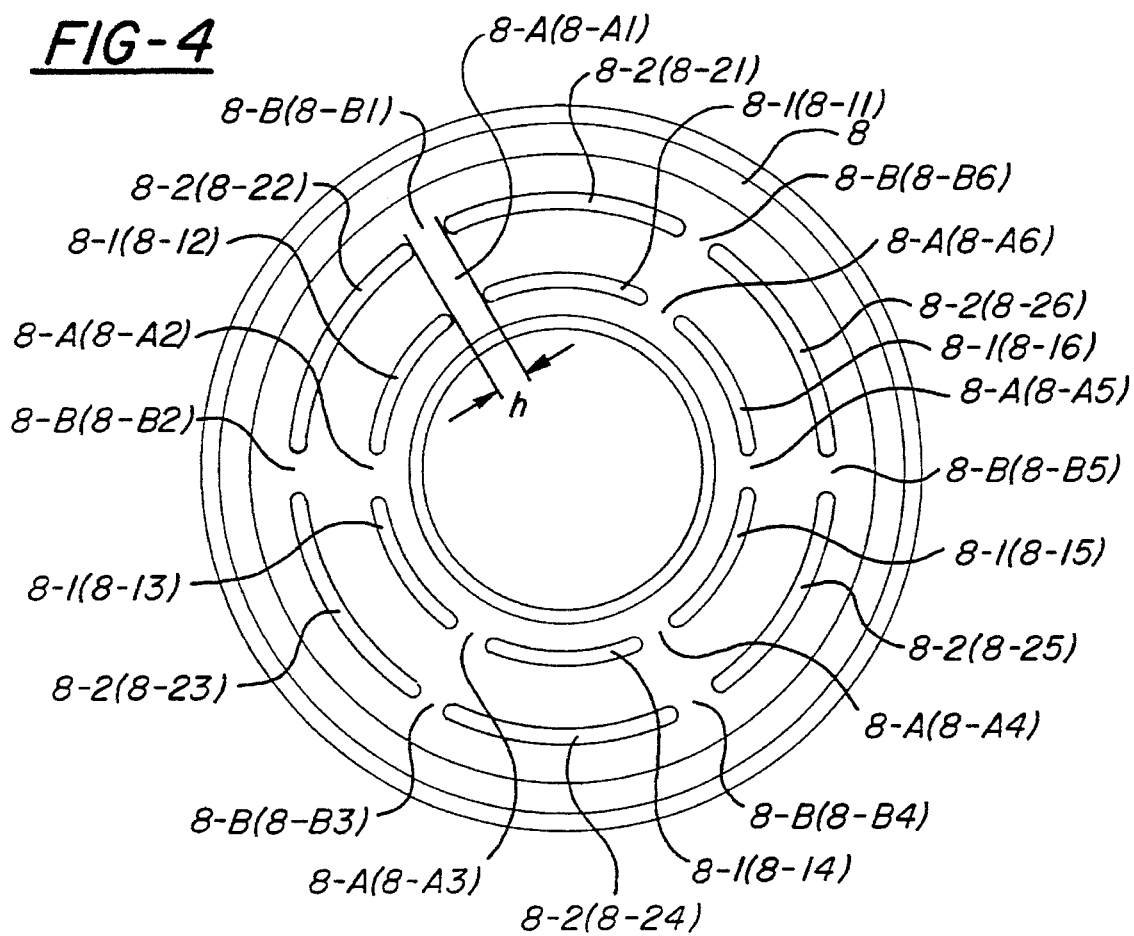
FIG. 4 an elevational view of the rotor used in the electromagnetic clutch taken in an axial direction.

The rotor 8, shown in FIG. 4, includes a plurality of six arc-shaped slots 8-1 (8-11 to 8-16), which constitute magnetic discontinuities, that are circumferentially formed in the rotor 8 on the inner circumferential side thereof. A plurality of six arc-shaped slots 8-2 (8-21 to 8-26), which constitute part of the magnetism interrupting part, are circumferentially formed in the rotor 8 on the outer circumferential side thereof. Each of the slots 8-1 and 8-2 has circumferentially opposed ends whose end faces have a semi-circular shape. Reference numbers 8-A (8-A1 to 8-A6) and 8-B (8-B1 to 8-B6) denotes small joint portions (hereinafter referred to as bridges) between the ends of adjacent slots 8-1 and 8-2.

The positions of the open slots 16-11 to 16-16 in the armature 16 are determined in such a manner that the slots 16-11 to 16-16 are opposed to the annular plate face defined between the slots 8-11 to 8-16 and the slots 8-21 to 8-26 on the rotor 8 in the assembled state as shown in FIG. 2. The bridges 16A of the armature 16 and the bridges 8-A and 8-B of the rotor 8 have the same circumferential size h.

Figure 1A:
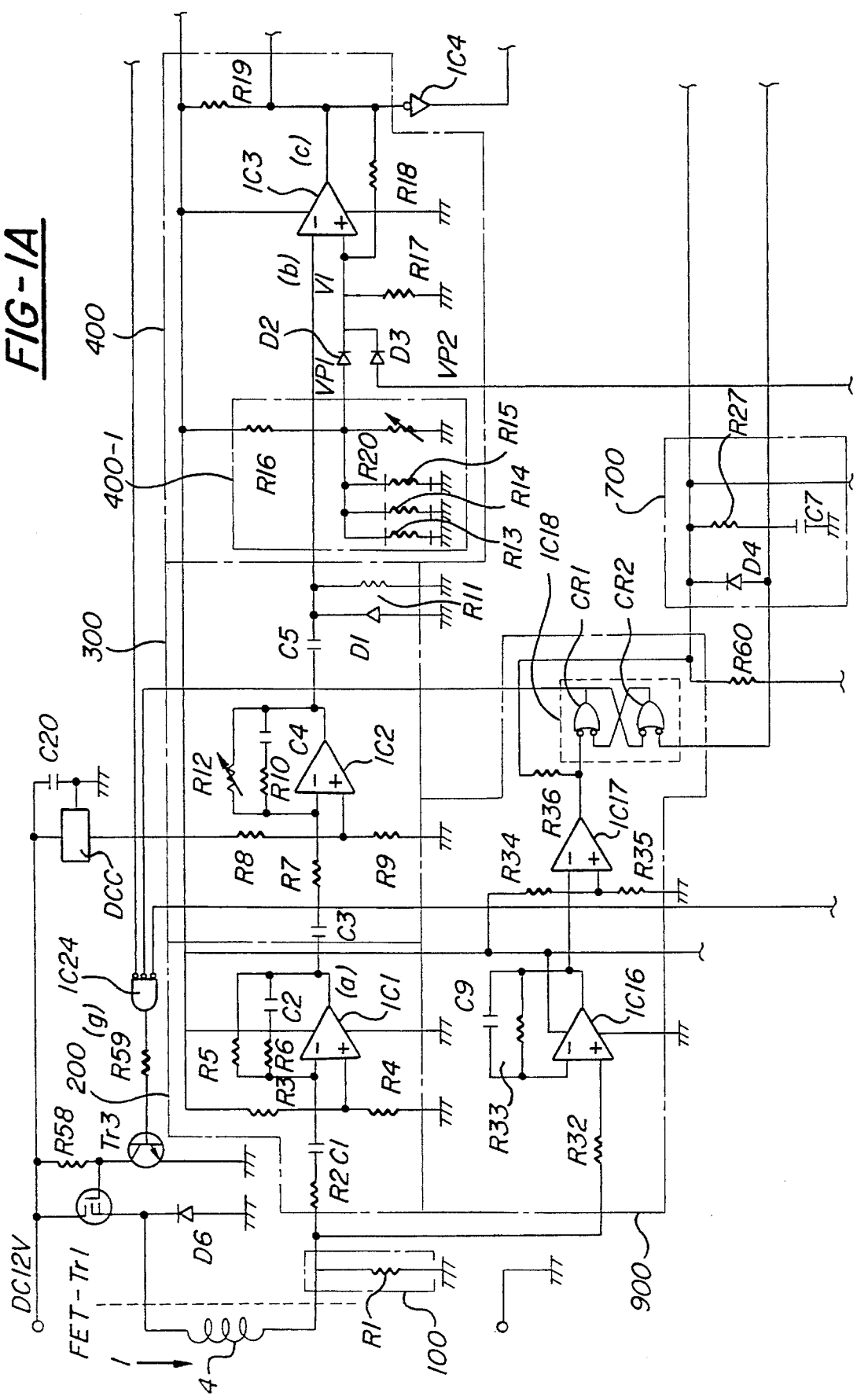
FIG. 1A is a circuit diagram showing a portion of the control circuit for detecting slip and controlling an electromagnetic clutch including a power source, a power transistor, an electromagnetic coil, a current detecting circuit, an inverting amplifier circuit, a bandpass filter 300, an comparing circuit, a power on reset circuit and an over current protection circuit.
Figure 1B:
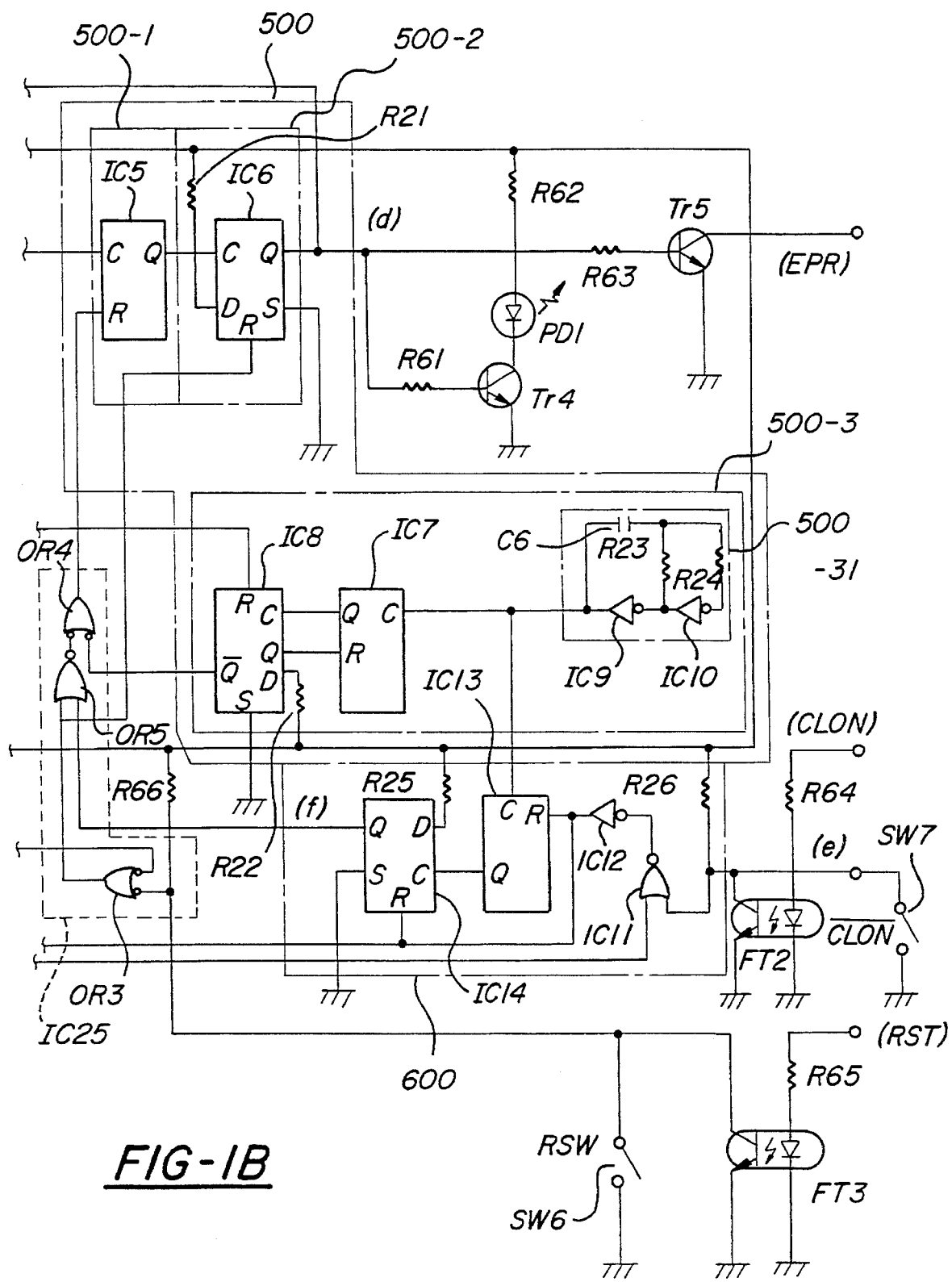
FIG. 1B is a circuit diagram showing a portion of the control circuit connected to the circuit shown in FIG. 1A including a continuous wave form confirming circuit, a delay circuit, a reset switch and a clutch switch.
Figure 1C:
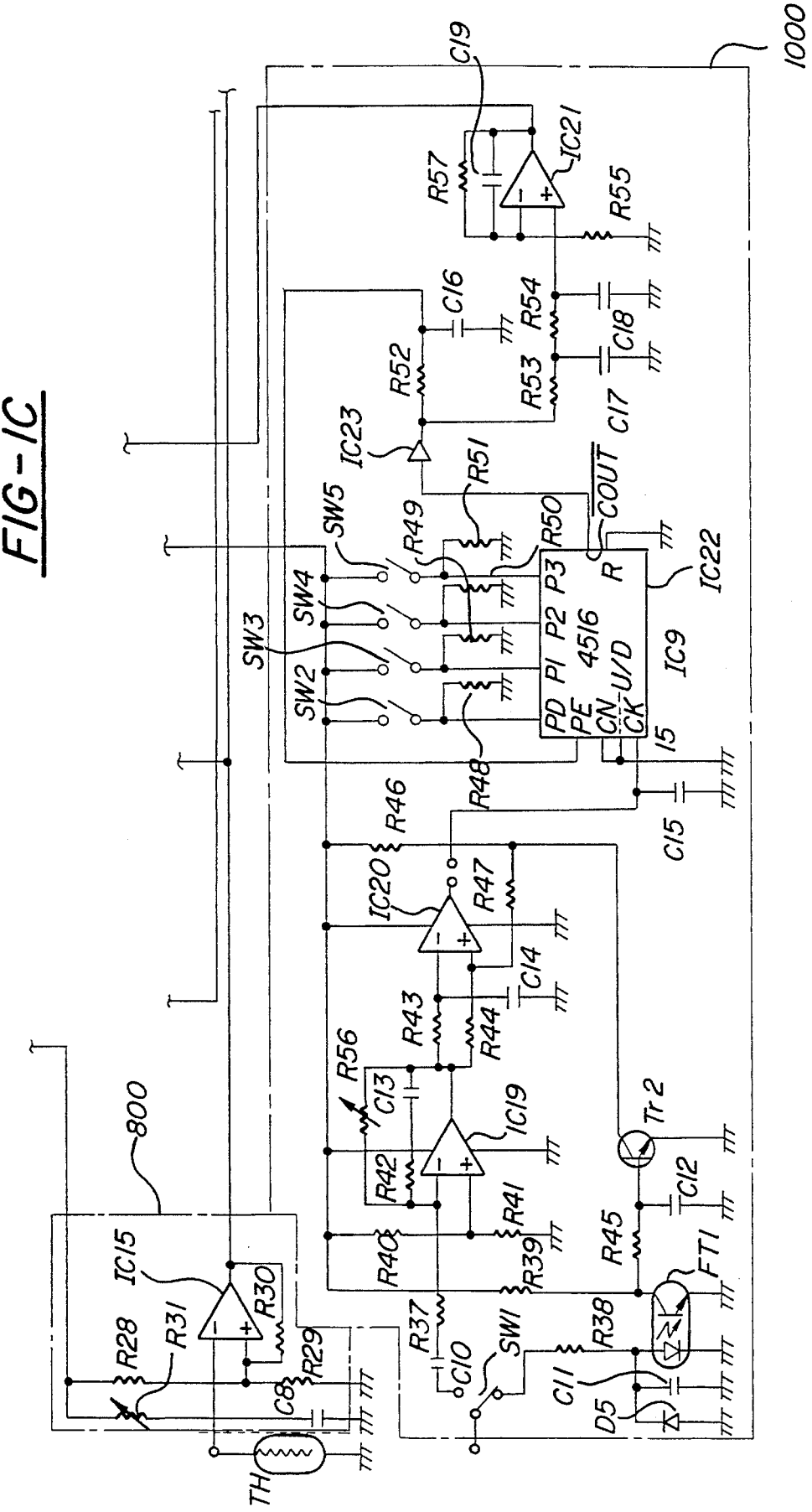
FIG. 1C is a circuit diagram showing a portion of the control circuit connected to the circuit portions shown in FIGS. 1A and 1B including a temperature measuring circuit and an engine speed detecting circuit.

A circuit diagram showing a control circuit connected to the electromagnetic coil 4 of the electromagnetic clutch is shown in FIGS. 1A, 1B and 1C. A power transistor FET Tr1 (a switching transistor: P-channel MOSFET) which is connected between one end of the electromagnetic coil 4 and a power source line (DC 12 volts). A diode D6 is connected to the lead from the power transistor FET-TR1 to the electromagnetic coil 4. A current detecting circuit 100 is formed by a current detecting small resistance R1 (of the order of 0.1Ω). The current detecting small resistance R1 is connected between the other end of the electromagnetic coil 4 and a grounding line.

An inverting amplifier circuit 200 is formed by an operational amplifier IC1, resistances R2 to R6 and capacitors C1 and C2. A gain of approximately 20 is set in the operational amplifier IC1 by the settings of the resistances R2 to R6. A series circuit formed by the capacitor C2 and the resistance R6 are connected in parallel with the feedback resistance R5 which is connected between the inverting input and the output of the operational amplifier IC1. A capacitor of, for example, a 1000 PF class is employed as the capacitor C2 so that a carrier (high frequency) component can be cut. In the present embodiment, since a waveform of 0.1 V/A is outputted from the current detecting circuit 100, a waveform of approximately 2 V/A is outputted from the inverting amplifier circuit 200.

The bandpass filter 300 (low pass filter) is formed by an operational amplifier IC2, resistances R7 to R11, a variable resistance R12, capacitors C3 to C5 in a diode D1, and serves to amplify the alternating current component of the output waveform of the inverting amplifier circuit 200. The bandpass filter 300 receives input from the inverting amplifier circuit 200 and from the power source DC12 V. The connection to the power source is through a DC/DC converter DCC. The converter DCC is connected to the power source DC12 V in parallel with a capacitor C20. The bandpass filter 300 amplifies the waveform to approximately 2 V/A to a waveform of approximately 100 V/A and takes out only the alternating current components of lower than two Khz.

The comparing circuit 400 is formed by a comparator IC3, resistances R13 to R19, a variable resistor R20, and diodes D2 and D3. The output of the bandpass filter 300 is applied to the inverting input of the comparator IC3. A reference voltage VP1 is outputted from the reference voltage generating part 400-1 formed by the resistances R13 to R16 and the variable resistance R20, while a set voltage VP2 is outputted from an engine speed detecting circuit 1000 which will be described later. The higher reference voltage VP1 and the set voltage VP2 is set at the non-inverting input of the comparator IC3 as a threshold voltage V1.

The continuous waveform confirming circuit 500 (a slip decision circuit) is formed by slip pulse counter 500-1, an abnormality signal holding circuit 500-2, and a reset timer circuit 500-3. The slip pulse counter 500-1 includes a frequency divider IC5. The abnormality signal holding circuit 500-2 includes a D flip-flop IC6 and a resistance R21. The reset timer circuit 500-3 includes a frequency divider IC7, a D flip-flop IC8 and a resistance R22 and an oscillator 500-31. The oscillator 500-31 includes inverters IC9 and IC10, resistances R23 and R24 and a capacitor C6. The oscillation frequency of the oscillator 500-31 is selected to be approximately 30 Hz.

The delay circuit 600 includes resistances R25 and R26, a negative logic output OR GATE IC11, an invertor IC12, a frequency divider IC13 and a D flip-flop IC14. An oscillation output from the oscillator 500-31 is applied to the clock terminal of the negative logic output OR GATE IC11.

The power on reset circuit 700 (differentiating circuit) includes a resistance R27, a capacitor C7 and a diode D4. A potential at the connection point between the resistance R27 and the capacitor C7 is provided as a power on reset signal.

The temperature measuring circuit 800 includes a comparator IC15, resistances R28 to R30, a variable resistance R31 and a capacitor C8. A voltage at the connection point between the thermistor TH and the variable resistance R31 is applied to the inverting input of the comparator IC15. The thermistor TH is disposed in the vicinity of the electromagnetic coil 4. A resistance R60 reduces the voltage output from the temperature measuring circuit 800 to the over current protection circuit 900 and the power on reset circuit.

The over current protection circuit 900 includes an operational amplifier IC16, a comparator IC17, a flip-flop circuit IC18, resistances R32 to R36, and a capacitor C9. The operational amplifier IC16 amplifies a small voltage detected by the current detecting circuit 100 (to approximately 1 V/A), and the comparator IC17 compares the amplified voltage with a predetermined voltage. The flip-flop circuit IC18 includes two NAND gates CR1 and CR2.

The engine speed detecting circuit 1000 includes operational amplifiers IC19 to IC21, a photo coupler FT1, a logic circuit IC22, resistances R37 to R55, a variable resistance R56, a resistance R57, an invertor IC23, capacitors C10 to C19, a diode D5, and NPN transistor Tr2, and switches SW1 to SW5. The engine speed detecting circuit 1000 divides the frequency of an ignition pulse supplied from the negative terminal of an ignition coil (not shown) on the basis of settings of the internal circuit according to the number of cylinders and the kind of engine, such as a two-cycle engine, a four cycle engine or a rotary engine, and obtains a voltage (1 V/1000 RPM) proportional to the rotation speed of the engine as a set voltage VP2 and applies the set voltage VP2 to the comparing circuit 400.

An NPN transistor Tr3 and the gate of the power transistor FET Tr1 is connected to a connection line between the collector of the transistor Tr3 and a resistance R58. The output of a negative logic input AND gate IC24 is applied to the base of the transistor Tr3 via a resistance R59. Also applied to the AND gate IC24, are the output of the abnormality signal holding circuit 500-2 of the continuous waveform confirming circuit 500, the output of the flip-flop circuit IC18 of the over current protection circuit 900, and the output of the converter IC12 of the delay circuit 600.

A logic circuit IC25 formed by negative logic input OR gates OR3 and OR4 and a negative output OR gate OR5 as shown in FIG. 1. The voltage input to the logic circuit IC25 from the power on reset circuit 700 is reduced by a resistor R66. NPN transistors Tr4 and Tr5, a light emitting diode PD1, photo couplers FT2 and FT3, a reset switch SW6, a clutch switch SW7, a DC/DC converter DCC for converting a direct current of 12 volts into a direct current of 5 volts and an inverter IC4 are also shown in FIG. 1. The NPN transistor Tr4 and the light emitting diode PDI provide a visual indicator that the electromagnetic coil 4 has been deenergized. The resistors R61 and R62 protect the diode PDI from excessive current. The NPN transistor Tr5 provides a signal to outside controls EPR that the clutch has been disengaged. A resistor R63 protects the NPN transistor Tr5 from excessive current.

The operation of the electromagnetic clutch arranged in the above described manner will be described below with reference to FIG. 5 which shows a variation in a current (exciting current) I flowing in the electromagnetic coil 4 and FIG. 6 which shows the signal waveforms appearing in the respective parts of the control circuit. In FIG. 6, part (A) represents the output of the operational amplifier IC1 of the inverting amplifier circuit 200, part (B) represents the inverted input of the comparator IC3 of the comparing circuit 400, part (C) represents the output of the comparator IC3, part (D) represents the output (the Q output of the D flip-flop IC6) of the abnormality signal holding circuit 500-2 of the continuous waveform confirming circuit 500, part (E) represents a clutch driving signal CLON, part (F) represents the output (the Q output of the D flip-flop IC14) of the delay circuit 600, and part (G) represents the output of the AND gate IC24.

The rotor 8 integral with the V pulley 10 as shown in FIG. 2 rotates about the nose portion 1a of the housing 1 supported by the bearing 6 when the V pulley 10 is driven by the driving source (engine). In such a situation, in the control circuit shown in FIG. 1, if the switch SW7 is turned on and the clutch driving signal CLON goes to its "L" level (the point t1 shown in FIG. 6(E)), the output of the OR gate IC11 goes to its "H" level and the output of the inverter IC12 goes to its "L" level, so that the output of the AND gate IC24 goes to its "H" level (the point t1 shown in FIG. 6(g). Thus the power transistor FET Tr1 is driven to be placed in its on state and the current I starts to be supplied to the electromagnetic coil 4 (the point t1 shown in FIG. 5). When the electromagnetic coil 4 is excited a magnetic flux circuit is formed in which a magnetic flux exits from the yoke 2 and passes through the outer pole of the rotor 8 to the armature 16 and returns to the yoke 2 through the inner pole of the rotor 8. Accordingly, the armature 16 is attracted to the rotor 8 against the urging force of the plate spring 15 (the point t2 shown in FIG. 5: the time between t1 and t2 is an armature attraction time). More specifically, by supplying the current I to the electromagnetic coil 4, the slots 8-1, 8-2 and 16-1 are made to constitute the magnetism interrupting part and the armature 16 is attracted to the rotor 8. The armature 16 rotates integrally with the rotor 8 and the rotating shaft 11 integral with the armature 16 rotates and the compressor starts to operate.

The current I supplied to the electromagnetic coil 4 is subsequently increased as shown in FIG. 5, until a saturation value (steady current) is reached. Also if the output of the inverter IC12 goes to the "L" level, the frequency diverter IC13 in the delay circuit 600 is released from the set state in which the frequency diverter IC13 has been so far placed and starts to count the oscillation output of the oscillator 500-31. At the time when a predetermined count value is reached (in the present embodiment, at the time when 0.5 seconds elapses), the Q output of the frequency divider IC13 is set to the "H" level. More specifically, at time t3 when a predetermined time (connecting time) T1 elapses after the current I supplied to the electromagnetic coil 4 has reached the saturation value, the Q output of the frequency divider IC13 is set to its "H" level, whereby the Q output of the D flip-flop IC14 goes to its "L" level (the point t3 shown in FIG. 6(F)). When the Q output of the D flip-flop IC14 goes to the "L" level, the output of the OR gate OR5 goes to its "H" level and the output of the reset timer circuit 500-3 (the Q output of the D flip-flop IC5) is usefully applied to the slip pulse counter 500-1 by the OR gate OR4.

The rotation slip between the rotor 8 and the armature 16 is assumed to have occurred at the time t4 shown in FIG. 5. In this case, the current I supplied to the electromagnetic coil 4 gradually decreases at a small rate owing to the heat generated by the friction surfaces of the rotor 8 and the armature 16. As rotation slip continues, the current I supplied to the electromagnetic coil 4 decreases locally abruptly as shown by S1, S2, S3 . . . , whereby the unique waveform is formed. This unique waveform is formed owing to the phenomenon in which when the rotational annular position of the respective bridges 8-A and 8-B of the rotor 8 coincide with those of the bridges 16-A of the armature 16, the inductance varies rapidly in the supply of current I to the electromagnetic coil 4 is suppressed.

The current I supplied to the electromagnetic coil 4 is detected by the current detecting circuit 100, and a voltage proportional to the detected current is applied to the inverting amplifier circuit 200. The inverting amplifier circuit 200 inverts and amplifies the voltage applied from the current detecting circuit 100 (refer to FIG. 6(a)), and applies the inverted and amplified voltage to the bandpass filter 300. The bandpass filter 300 cuts the alternating circuit components above 2 kHz and takes out only the alternating current components of 2 kHz or below. Thus an alternating current component according to the unique waveform shown by S1, S2, S3, . . . in FIG. 5, which is 2 kHz or below, is applied to the comparing circuit 400 through the bandpass filter 300.

The comparing circuit 400 compares the threshold V1 with the instantaneous value of the alternating component applied from the bandpass filter 300, and provides a comparison output of "L" level while the instantaneous value of the alternating component exceeds the threshold V1 (refer to FIGS. 6(B) and 6(C)). Thus the comparing circuit 400 continuously generates the comparison output (slip pulse) of "L" level in accordance within the unique waveform shown by S1, S2, S3, . . . in FIG. 5.

As described previously, the threshold V1 used in the comparing circuit 400, makes use of the higher voltage of the reference voltage VP1 supplied from the reference voltage generating part 400-1 and the set voltage VP2 supplied from the engine speed detecting circuit 1000. More specifically, the reference voltage VP1 is set as a threshold V1 during the period in which the rotational speed of the engine has not yet exceeded a predetermined rotational speed (a rotational speed in an extremely low speed range), and when the predetermined rotational speed is exceeded, the set voltage V2 is set as the threshold V1. The higher the rotational speed of the engine or the rotor 8, the higher the set voltage V2. If the threshold V1 raises with the increased rotational speed of the rotor 8, a rotation noise is not erroneously detected as a slip noise.

More specifically, if the rotor 8 and the armature 16 rotate integrally, the clutch functions as a generator and adds a small rotational noise to the exciting circuit I, owing to the fact that individual circumferential portions differ in magnetic resistance. As the rotational speed of the rotor 8 becomes higher, the peaks of the slip noise and the rotation noise added to the exciting current I become higher. As a result, in the case where the threshold V1 is constant, if the rotational speed of the rotor 8 raises and the peak of the rotation noise raises, the rotation noise may be detected as a slip noise. In the present embodiment, however, since the threshold V1 rises as the rotational speed of the rotor 8 becomes higher, even if the peak of the rotation noise raises, it is possible to prevent the rotation noise from being erroneously detected as a slip noise.

The slip pulses outputted from the comparing circuit 400 are supplied both directly and through the inverter IC4 to the continuous waveform confirming circuit 500. In the continuous waveform confirming circuit 500, the D flip-flop IC8 is reset by a first slip pulse inverted by the inverter IC4. Thus, the Q output of the D flip-flop IC8 goes to its "H" level and, on the assumption that a delay time T1 has elapsed, the output of the OR gate OR4 is set to its "L" level and the frequency divider IC5 in the slip pulse counter 500-1 is released from the reset state. Then the frequency divider IC5 starts counting slip pulses supplied from the comparing circuit 400.

on the other hand, if the D flip-flop IC8 is reset, the Q output thereof goes to its "L" level and the frequency divider IC7 starts counting the oscillation output of the oscillator 500-31. When a predetermined count value is reached, that is, when T2 seconds (in the present embodiment, approximately 4 seconds) elapses after the frequency divider IC7 has started counting the oscillation output, the Q output of the frequency divider IC7 is set to its "H" level. Thus, the Q and the Q outputs of the D flip-flop IC8 go to their "L" levels and the frequency divider IC5 and the frequency divider IC7 are reset.

If the frequency divider IC5 counts a predetermined number of slip pulses (in the present embodiment, 128 pulses) by the time the Q output of the D flip-flop IC8 returns to the "L" level after the Q output of the D flip-flop IC8 has gone to the "H" level, that is, by the time T2 seconds elapse after the first slip volts has been generated, the Q output of the frequency divider IC5 goes to its "H" level and the Q output of the D flip-flop IC6 goes to its "H" level (refer to FIG. 6(D)). Thus, the transistor Tr4 is turned on, and the light emitting diode PD1 emits light to indicate that a rotation slip has occurred. The transistor Tr5 is also turned on, and an ERR signal (abnormality signal) is transmitted to a control part (not shown) of the system to indicate to the control part that the rotation slip has occurred. The control part of the system executes appropriate abnormality processing.

If the Q output of the D flip-flop IC6 goes to the "H" level, the output of the AND gate IC24 goes to its "L" level (refer to FIG. 6(g)), so that the on driving of FET Tr1 is interrupted and the supply of the current I to the electromagnetic coil 4 is interrupted. When the supply of the current I to the electromagnetic coil 4 is interrupted the armature 16 is moved away from the rotor 8 by the urging force of the plate spring 15 so that the transmation of rotational torque is canceled and the rotation of the rotating shaft 11 comes to a stop. On the other hand, if the frequency divider IC5 does not complete counting the predetermined number of slip pulses within T2 seconds after the first slip pulse has been generated, the frequency divider IC5 is soon reset with its Q output remaining at the "H" level. Then after the frequency divider IC5 has been reset, the D flip-flop IC8 is again reset by the first slip pulse which is a slip pulse that is next outputted from the comparing circuit 400, and the above described rotation slip decision operation is repeated. In other words, in an electromagnetic clutch according to the present embodiment, monitoring of the unique waveform which decreases locally abruptly is continued from a predetermined time instant after the supply current I has reached its saturation value. If a predetermined number of slip pulses occur within the predetermined time T2 after the first slip pulse has been generated, it is determined that a rotational slip has occurred. Accordingly, it is possible to prevent an erroneous operation due to other incidental noise (a disturbance noise due to the on/off operation of each electrical part or the like), whereby it is possible to improve reliability.

A rotation slip is detected on the basis of a variation which occurs in the current I supplied to the electromagnetic coil 4 when the rotation angular positions of the respective bridges 8-A and 8-B of the rotor 8 coincide with those of the bridges 16-A of the armature 16. It is possible to economically produce the electromagnetic clutch without the need to add special additional structure to the existing rotor 8 or the armature 16.

Since the frequency components above 2 kHz can be cut by the bandpass filter 300, it is possible to eliminate various noises such as a noise generated from an alternator which is peripheral auxiliary equipment. Accordingly, it is possible to avoid erroneous detection of a slip noise, thereby improving the reliability to a further extent.

It is to be noted that the set state of the D flip-flop IC6 in the continuous waveform confirming circuit 500, that is, the state in which the supply of the current I to the electromagnetic coil 4 is interrupted, can be reset by applying a reset signal RST, as required. Specifically, when the switch SW6 is turned on, the reset signal RST of "L" level is applied to the OR gate OR3. The output of the OR gate OR3 goes to its "H" level and the D flip-flop IC6 is reset, and the Q output of the D flip-flop IC6 is returned to the "L" level.

When the resistance value of the thermistor TH decreases to a prescribed value or below owing to a rise in the Joule heat of the electromagnetic coil 4 or the ambient temperature of the electromagnetic clutch, the output of the comparator IC15 in the temperature measuring circuit 800 goes to its "H" level. Accordingly, the output of the OR gate IC11 goes to its "L" level, the output of the inverter IC12 goes to its "H" level, and the output of the AND gate IC24 goes to its "L" level. The power transistor FET Tr1 is cut off, and the supply of current I to the electromagnetic coil 4 is interrupted. This function is, in many cases, used for heat protection of the compressor.

When the temperature lowers owing to the heat protection using the thermistor TH and the output of the comparator IC15 in the temperature measuring circuit 800 returns to the "L" level, the output of 10 the OR gate IC11 goes to the "H" level and the output of the inverter IC12 goes to the "L" level, and the delay operation of the delay circuit 600 is started. Further, the output of the AND gate IC24 goes to the "H" level in the power transistor FET Tr1 is driven to be placed in the on state so that a supply of the current I to the electromagnetic coil 4 is started. Thus, the function of self-recovery from the heat protection using the thermistor TH is ensured.

When an over current flows in the electromagnetic coil 4, the output of the comparator IC17 and the over current protection circuit 900 goes to its begin "L" level. Thus, the output of the flip-flop circuit IC18 goes to its "H" level and the output of the AND gate IC24 goes to the "L" level, whereby the power transistor FET Tr1 is cut off and the supply of the current I to the electromagnetic coil 4 is interrupted. Accordingly, it is possible to prevent breakage of the power transistor FET Tr1. Also, when the power source is turned on, the flip-flop circuit IC18, the frequency divider IC5 and the D flip-flop IC6 are reset by the operation of the power on reset circuit 700 so that the control circuit is necessarily initialized.

In the foregoing description, reference has been made to the example in which the clutch driving signal CLON is set in the "L" level by turning on the switch SW7. However, it is also possible to set the clutch driving signal CLON to the "L" level by applying a signal of "H" level to the photo coupler FT2 via a resistance R64. In the foregoing description, reference has also been made to the example in which the reset signal RST of "L" level is applied by turning on the switch SW6. However, it is also possible to apply the reset signal RST of "L" level by applying a signal of "H" level to the photo coupler FT3 via a resistance R65.

In the foregoing description, reference has been made to the example in which the voltage outputted from the current detecting circuit 100 is inverted and amplified. However, the alternating current component can be taken out by amplifying the voltage without inverting it. In the present embodiment, although the driving source is an engine, the kind of driving sources, of course, not limit to an engine. It is also possible to variously alternate the shapes and layout of the slots and the rotor 8 and the armature 16 which are magnetic discontinuities.

As is apparent from the foregoing description, in accordance with the present invention, a variation in supplied voltage is taken out, and the instantaneous value of the taken out alternating circuit component is compared to a threshold which rises as the rotational speed of the rotor becomes higher, and while the instantaneous value exceeds the threshold, a comparison output is set. Accordingly, even if the peak of the rotation noise rises, it is possible to prevent this peak from being erroneously detected as a slip noise. Also, if a predetermined number of comparison outputs are detected within a predetermined time after a first slip pulse has been generated, it is determined that a rotation slip has occurred. Accordingly, it is possible to prevent an erroneous operation due to other incidental noises (a disturbance noise due to the on/off operation of each electrical part or the like), whereby it is possible to improve the reliability of a rotation slip detecting function.

The preferred embodiment of the invention has been described in detail but is an example only and the invention is not restricted thereto. It will be easily understood by those skilled in the art that modifications and variations can easily be made within the scope of this invention.

What is claimed is:

1. An electromagnetic clutch with a rotor and an armature each having magnetic discontinuities, and an electromagnetic coil, a current source, and a control circuit for connecting the electromagnetic coil to the current source and wherein the rotor and the armature are attracted to each other to form a magnetic circuit when the coil is energized, said control circuit comprising a current detector for detecting a current which flows in the electromagnetic coil and outputting a voltage corresponding to the current; an amplifier for amplifying the voltage outputted from said detector; a bandpass filter for taking out an alternating current component of a predetermined frequency or a lower frequency than a predetermined frequency contained in the voltage amplified by said amplifier; a comparator for comparing a threshold with an instantaneous value of an alternating current component taken out by said bandpass filter and sending out a comparator output while the instantaneous value of the alternating current component exceeds the threshold; a threshold riser for raising the threshold as the rotational speed of the rotor becomes higher; and a slip decision circuit arranged to determine, if a predetermined number of comparison outputs are detected within a predetermined time after a first comparison output has been generated, that a rotation slip has occurred in the state of the rotor and the armature being attracted to each other, said slip decision circuit being also arranged to set, if the predetermined number of comparison outputs are not detected within the predetermined time, a comparison output to be next generated as the first comparison output and repeat the afore said rotation slip decision operation.

2. An electromagnetic clutch as set forth in claim 1 wherein the amplifier includes an inverter that inverts the voltage output of the current detector.

3. An electromagnetic clutch as set forth in claim 1 wherein the bandpass filter removes alternating current components above 2 kHz.

4. An electromagnetic clutch as set forth in claim 1 including a temperature measuring circuit which senses the temperature of the electromagnetic coil and interrupts the supply of current to the electromagnetic coil when the temperature sensed increases to a predetermined temperature.

5. An electromagnetic clutch as set forth in claim 4 wherein the temperature measuring circuit is operable to restore the supply of current to the electromagnetic coil when the temperature sensed decreases to a predetermined temperature.

6. An electromagnetic clutch as set forth in claim 1 including an over current protection circuit which discontinues the supply of current to the electromagnetic coil when current flow in the electromagnetic coil exceeds a predetermined level.

7. An electromagnetic clutch as set forth in claim 1 including a power on reset circuit which resets said slip decision circuit when the electromagnetic coil is energized.

8. An electromagnetic clutch with a rotor and an armature each having magnetic discontinuities, an electromagnetic coil associated with the rotor and the armature, a source of current that energizes the electromagnetic coil thereby inducing an electromagnetic force that pulls the armature and rotor into contact with each other to engage the clutch and a control circuit for energizing the electromagnetic coil, said control circuit comprising:

a switch for energizing the electromagnetic coil;

a current detector for detecting current in the electromagnetic coil and outputting a signal that is proportional to the current in the electromagnetic coil;

a bandpass filter for receiving a signal from the current detector and separating an alternating signal component of a predetermined frequency contained in the signal from the current detector;

a comparator for comparing a threshold with an instantaneous value of a signal from the bandpass filter and sending out a comparator output while the instantaneous value of the signal from the bandpass filter exceeds the threshold;

a threshold adjuster for adjusting the threshold used by the comparator as the rotational speed of the rotor changes; and a slip decision circuit which receives output signals from the comparator determines the number of output signals received from the comparator during a time interval and disconnects the source of current from the electromagnetic coil when the number of output signals received from the comparator exceeds a predetermined quantity thereby indicating that the rotor is slipping relative to the armature.

9. An electromagnetic clutch as set forth in claim 8 wherein the clutch control circuit includes an amplifier for amplifying the output signal of the current detector.

10. An electromagnetic clutch as set forth in claim 9 wherein the amplifier includes an inverter that inverts the output signal of the current detector.

11. An electromagnetic clutch as set forth in claim 8 wherein the bandpass filter removes alternating signal components above 2 kHz.

12. An electromagnetic clutch as set forth in claim 8 wherein the clutch control circuit includes a temperature measuring circuit which senses the temperature adjacent to the electromagnetic coil and interrupts the supply of current to the electromagnetic coil when the temperature sensed increases to a predetermined temperature.

13. An electromagnetic clutch as set forth in claim 8 wherein the control circuit includes an over current protection circuit which discontinues the supply of current to the electromagnetic coil when current flow in the electromagnetic coil exceeds a predetermined level.

14. An electromagnetic clutch as set forth in claim 8 wherein the control circuit includes a power on reset circuit which resets said slip decision circuit when the electromagnetic coil is energized.

* * * * *